(12) United States Patent
Liu et al.

(10) Patent No.: US 8,542,212 B2
(45) Date of Patent: Sep. 24, 2013

(54) TOUCH PANEL, METHOD FOR MAKING THE SAME, AND DISPLAY DEVICE ADOPTING THE SAME

(75) Inventors: Chang-Hong Liu, Beijing (CN); Kai-Li Jiang, Beijing (CN); Liang Liu, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 818 days.

(21) Appl. No.: 12/286,228

(22) Filed: Sep. 29, 2008

(65) Prior Publication Data

US 2009/0153516 A1 Jun. 18, 2009

(30) Foreign Application Priority Data

Dec. 12, 2007 (CN) .......................... 2007 1 0125107

(51) Int. Cl.
*G06F 3/045* (2006.01)

(52) U.S. Cl.
USPC ......................................................... 345/174

(58) Field of Classification Search
USPC ................ 345/1.1, 173, 174; 428/1.4, 297.4, 428/411.1; 349/123; 205/159
See application file for complete search history.

(56) References Cited

U.S. PATENT DOCUMENTS

| | | | |
|---|---|---|---|
| 4,659,873 A | 4/1987 | Gibson et al. | |
| 4,922,061 A | 5/1990 | Meadows et al. | |
| 4,933,660 A | 6/1990 | Wynne, Jr. | |
| 5,181,030 A | 1/1993 | Itaya et al. | |
| 5,853,877 A | 12/1998 | Shibuta | |
| 5,861,583 A | 1/1999 | Schediwy et al. | |
| 5,931,764 A | 8/1999 | Freeman et al. | |
| 6,373,472 B1 | 4/2002 | Palalau et al. | |
| 6,423,583 B1 | 7/2002 | Avouris et al. | |
| 6,628,269 B2 | 9/2003 | Shimizu | |
| 6,629,833 B1 | 10/2003 | Ohya et al. | |
| 6,914,640 B2 | 7/2005 | Yu | |
| 6,947,203 B2 | 9/2005 | Kanbe | |
| 7,054,064 B2 | 5/2006 | Jiang et al. | |

(Continued)

FOREIGN PATENT DOCUMENTS

| | | |
|---|---|---|
| CN | 2539375 | 3/2003 |
| CN | 1447279 | 10/2003 |

(Continued)

OTHER PUBLICATIONS

Kai-Li Jiang, Qun-Qing Li, Shou-Shan Fan, "Continuous carbon nanotube yarns and their applications", Physics, China, pp. 506-510, Aug. 31, 2003,32(8)(lines from the 4th line to 35th line in the right column of p. 507 may be relevant).

(Continued)

*Primary Examiner* — Nabil Hindi
(74) *Attorney, Agent, or Firm* — Altis Law Group, Inc.

(57) ABSTRACT

A touch panel includes a first electrode plate, and a second electrode plate separated from the first electrode plate. The first electrode plate includes a first substrate and a first conductive layer located on a lower surface of the first substrate. The second electrode plate includes a second substrate and a second conductive layer located on an upper surface of the second substrate. At least one of the first conductive layer and the second conductive layer includes a carbon nanotube layer. The carbon nanotubes in the carbon nanotube layer form a carbon nanotube floccule structure.

24 Claims, 5 Drawing Sheets

(56) References Cited

U.S. PATENT DOCUMENTS

| | | |
|---|---|---|
| 7,060,241 B2 | 6/2006 | Glatkowski |
| 7,071,927 B2 | 7/2006 | Blanchard |
| 7,084,933 B2 | 8/2006 | Oh et al. |
| 7,194,912 B2 * | 3/2007 | Jordan et al. ............ 73/774 |
| 7,196,463 B2 | 3/2007 | Okai et al. |
| 7,215,329 B2 | 5/2007 | Yoshikawa et al. |
| 7,242,136 B2 | 7/2007 | Kim et al. |
| 7,336,261 B2 | 2/2008 | Yu |
| 7,348,966 B2 | 3/2008 | Hong et al. |
| 7,355,592 B2 | 4/2008 | Hong et al. |
| 7,442,284 B2 * | 10/2008 | Ren et al. ............ 205/159 |
| 7,532,182 B2 | 5/2009 | Tseng et al. |
| 7,593,004 B2 * | 9/2009 | Spath et al. ............ 345/174 |
| 7,630,040 B2 * | 12/2009 | Liu et al. ............ 349/123 |
| 7,656,365 B2 * | 2/2010 | Moore ............ 345/1.1 |
| 7,662,732 B2 | 2/2010 | Choi et al. |
| 7,663,607 B2 | 2/2010 | Hotelling et al. |
| 7,704,480 B2 | 4/2010 | Jiang et al. |
| 7,710,649 B2 | 5/2010 | Feng et al. |
| 7,796,123 B1 | 9/2010 | Irvin, Jr. et al. |
| 7,825,911 B2 | 11/2010 | Sano et al. |
| 7,854,992 B2 | 12/2010 | Fu et al. |
| 7,947,977 B2 | 5/2011 | Jiang et al. |
| 2002/0089492 A1 | 7/2002 | Ahn et al. |
| 2003/0122800 A1 | 7/2003 | Yu |
| 2003/0147041 A1 | 8/2003 | Oh et al. |
| 2003/0189235 A1 | 10/2003 | Watanabe et al. |
| 2004/0047038 A1 | 3/2004 | Jiang et al. |
| 2004/0053780 A1 | 3/2004 | Jiang et al. |
| 2004/0099438 A1 | 5/2004 | Arthur et al. |
| 2004/0105040 A1 | 6/2004 | Oh et al. |
| 2004/0136896 A1 | 7/2004 | Liu et al. |
| 2004/0191157 A1 | 9/2004 | Harutyunyan et al. |
| 2004/0251504 A1 | 12/2004 | Noda |
| 2005/0110720 A1 | 5/2005 | Akimoto et al. |
| 2005/0151195 A1 | 7/2005 | Kavase et al. |
| 2005/0209392 A1 | 9/2005 | Luo et al. |
| 2006/0010996 A1 | 1/2006 | Jordan et al. |
| 2006/0022221 A1 | 2/2006 | Furukawa et al. |
| 2006/0044284 A1 | 3/2006 | Tanabe |
| 2006/0061704 A1 | 3/2006 | Hayano et al. |
| 2006/0077147 A1 | 4/2006 | Palmateer et al. |
| 2006/0097991 A1 | 5/2006 | Hotelling et al. |
| 2006/0171032 A1 | 8/2006 | Nishioka |
| 2006/0187213 A1 | 8/2006 | Su |
| 2006/0187369 A1 | 8/2006 | Chang |
| 2006/0188721 A1 | 8/2006 | Irvin, Jr. et al. |
| 2006/0213251 A1 | 9/2006 | Rinzler et al. |
| 2006/0240605 A1 | 10/2006 | Moon et al. |
| 2006/0262055 A1 | 11/2006 | Takahara |
| 2006/0263588 A1 | 11/2006 | Handa et al. |
| 2006/0274047 A1 | 12/2006 | Spath et al. |
| 2006/0274048 A1 | 12/2006 | Spath et al. |
| 2006/0274049 A1 | 12/2006 | Spath et al. |
| 2006/0275956 A1 | 12/2006 | Konesky |
| 2006/0278444 A1 | 12/2006 | Binstead |
| 2007/0065651 A1 | 3/2007 | Glatkowski et al. |
| 2007/0075619 A1 | 4/2007 | Jiang et al. |
| 2007/0081681 A1 | 4/2007 | Yu et al. |
| 2007/0085838 A1 | 4/2007 | Ricks et al. |
| 2007/0099333 A1 | 5/2007 | Moriya |
| 2007/0165004 A1 | 7/2007 | Seelhammer et al. |
| 2007/0182720 A1 | 8/2007 | Fujii et al. |
| 2007/0215841 A1 | 9/2007 | Ford et al. |
| 2007/0257894 A1 | 11/2007 | Philipp |
| 2007/0262687 A1 | 11/2007 | Li |
| 2007/0279556 A1 | 12/2007 | Wang et al. |
| 2007/0296897 A1 | 12/2007 | Liu et al. |
| 2007/0298253 A1 | 12/2007 | Hata et al. |
| 2008/0007535 A1 | 1/2008 | Li |
| 2008/0029292 A1 | 2/2008 | Takayama et al. |
| 2008/0048996 A1 | 2/2008 | Hu et al. |
| 2008/0088219 A1 | 4/2008 | Yoon et al. |
| 2008/0095694 A1 | 4/2008 | Nakayama et al. |
| 2008/0129666 A1 | 6/2008 | Shimotono et al. |
| 2008/0138589 A1 | 6/2008 | Wakabayashi et al. |
| 2008/0192014 A1 | 8/2008 | Kent et al. |
| 2008/0238882 A1 | 10/2008 | Sivarajan et al. |
| 2008/0248235 A1 | 10/2008 | Feng et al. |
| 2008/0266273 A1 | 10/2008 | Slobodin et al. |
| 2009/0032777 A1 | 2/2009 | Kitano et al. |
| 2009/0056854 A1 | 3/2009 | Oh et al. |
| 2009/0059151 A1 | 3/2009 | Kim et al. |
| 2009/0101488 A1 | 4/2009 | Jiang et al. |
| 2009/0153511 A1 | 6/2009 | Jiang et al. |
| 2009/0153513 A1 | 6/2009 | Liu et al. |
| 2009/0153514 A1 | 6/2009 | Jiang et al. |
| 2009/0153516 A1 | 6/2009 | Liu et al. |
| 2009/0167709 A1 | 7/2009 | Jiang et al. |
| 2009/0208708 A1 | 8/2009 | Wei et al. |
| 2009/0283211 A1 | 11/2009 | Matsuhira |
| 2009/0293631 A1 | 12/2009 | Radivojevic |
| 2010/0001972 A1 | 1/2010 | Jiang et al. |
| 2010/0001975 A1 | 1/2010 | Jiang et al. |
| 2010/0001976 A1 | 1/2010 | Jiang et al. |
| 2010/0007619 A1 | 1/2010 | Jiang et al. |
| 2010/0007624 A1 | 1/2010 | Jiang et al. |
| 2010/0007625 A1 | 1/2010 | Jiang et al. |
| 2010/0065788 A1 | 3/2010 | Momose et al. |
| 2010/0078067 A1 | 4/2010 | Jia et al. |
| 2010/0093247 A1 | 4/2010 | Jiang et al. |
| 2010/0171099 A1 | 7/2010 | Tombler, Jr. et al. |
| 2010/0271330 A1 | 10/2010 | Philipp |
| 2011/0032196 A1 | 2/2011 | Feng et al. |
| 2012/0105371 A1 | 5/2012 | Hotelling et al. |

FOREIGN PATENT DOCUMENTS

| | | |
|---|---|---|
| CN | 1447279 A | 10/2003 |
| CN | 1482472 | 3/2004 |
| CN | 1483667 | 3/2004 |
| CN | 1484865 | 3/2004 |
| CN | 1501317 | 6/2004 |
| CN | 1503195 | 6/2004 |
| CN | 1509982 | 7/2004 |
| CN | 1519196 | 8/2004 |
| CN | 2638143 | 9/2004 |
| CN | 1543399 | 11/2004 |
| CN | 1543399 A | 11/2004 |
| CN | 2706973 | 6/2005 |
| CN | 1671481 | 9/2005 |
| CN | 1675580 | 9/2005 |
| CN | 1690915 A | 11/2005 |
| CN | 1738018 | 2/2006 |
| CN | 1744021 A | 3/2006 |
| CN | 1745302 | 3/2006 |
| CN | 1803594 | 7/2006 |
| CN | 1823320 | 8/2006 |
| CN | 1292292 C | 12/2006 |
| CN | 2844974 Y | 12/2006 |
| CN | 1903793 | 1/2007 |
| CN | 1942853 | 4/2007 |
| CN | 1947203 | 4/2007 |
| CN | 1948144 | 4/2007 |
| CN | 1315362 | 5/2007 |
| CN | 1982209 | 6/2007 |
| CN | 1996620 | 7/2007 |
| CN | 1998067 | 7/2007 |
| CN | 101017417 | 8/2007 |
| CN | 101059738 | 10/2007 |
| CN | 101165883 | 4/2008 |
| CN | 101239712 | 8/2008 |
| CN | 101248411 | 8/2008 |
| DE | 202007006407 | 9/2007 |
| EP | 1739692 | 1/2007 |
| JP | S61-231626 | 10/1986 |
| JP | 61-283918 | 12/1986 |
| JP | S62-63332 | 3/1987 |
| JP | 62-139028 | 6/1987 |
| JP | S62-182916 | 8/1987 |
| JP | S62-190524 | 8/1987 |
| JP | 1-214919 | 8/1989 |
| JP | H2-8926 | 1/1990 |
| JP | 1991-54624 | 3/1991 |
| JP | H3-54624 | 3/1991 |

| | | |
|---|---|---|
| JP | 5-53715 | 3/1993 |
| JP | H06-28090 | 2/1994 |
| JP | H6-67788 | 3/1994 |
| JP | 1995-28598 | 1/1995 |
| JP | 8-287775 | 11/1996 |
| JP | H10-63404 | 3/1998 |
| JP | 10-246605 | 9/1998 |
| JP | 2001-34419 | 2/2001 |
| JP | 2001-267782 | 9/2001 |
| JP | 2002519754 | 7/2002 |
| JP | 2002-278701 | 9/2002 |
| JP | 2003-99192 | 4/2003 |
| JP | 2003-99193 | 4/2003 |
| JP | 2003-288164 | 10/2003 |
| JP | 2003303978 | 10/2003 |
| JP | 2004-26532 | 1/2004 |
| JP | 2004-102217 | 4/2004 |
| JP | 2004-189573 | 7/2004 |
| JP | 2004-253796 | 9/2004 |
| JP | 2004-266272 | 9/2004 |
| JP | 2005-67976 | 3/2005 |
| JP | 2005-85485 | 3/2005 |
| JP | 2005-176428 | 6/2005 |
| JP | 2005-182339 | 7/2005 |
| JP | 2005-222182 | 8/2005 |
| JP | 2005-286158 | 10/2005 |
| JP | 2006-171336 | 6/2006 |
| JP | 2006-228818 | 8/2006 |
| JP | 2006-243455 | 9/2006 |
| JP | 2006-521998 | 9/2006 |
| JP | 2006-269311 | 10/2006 |
| JP | 2006-285068 | 10/2006 |
| JP | 2006-330883 | 12/2006 |
| JP | 2007-11997 | 1/2007 |
| JP | 2007-31238 | 2/2007 |
| JP | 2007-73706 | 3/2007 |
| JP | 2007-112133 | 5/2007 |
| JP | 2007-123870 | 5/2007 |
| JP | 2007-161563 | 6/2007 |
| JP | 2007-161576 | 6/2007 |
| JP | 2007-182357 | 7/2007 |
| JP | 2007-182546 | 7/2007 |
| JP | 2007-229989 | 9/2007 |
| JP | 2007-299409 | 11/2007 |
| JP | 2007-310869 | 11/2007 |
| JP | 2008-102968 | 5/2008 |
| JP | 2008-139711 | 6/2008 |
| JP | 2008-536710 | 9/2008 |
| JP | 2008-542953 | 11/2008 |
| JP | 2009-104577 | 5/2009 |
| KR | 0525731 | 11/2005 |
| KR | 20060129977 | 12/2006 |
| KR | 20070012414 | 1/2007 |
| KR | 20070081902 | 8/2007 |
| KR | 2007-0108077 | 11/2007 |
| TW | 131955 | 4/1990 |
| TW | 341684 | 10/1998 |
| TW | 498266 | 8/2002 |
| TW | 508652 | 11/2002 |
| TW | 521227 | 2/2003 |
| TW | 200403498 | 3/2004 |
| TW | 242732 | 9/2004 |
| TW | 200518195 | 6/2005 |
| TW | I233570 | 6/2005 |
| TW | I234676 | 6/2005 |
| TW | 200522366 | 7/2005 |
| TW | 284963 | 1/2006 |
| TW | I249134 | 2/2006 |
| TW | I249708 | 2/2006 |
| TW | I251710 | 3/2006 |
| TW | I253846 | 4/2006 |
| TW | 200622432 | 7/2006 |
| TW | I258708 | 7/2006 |
| TW | I261716 | 9/2006 |
| TW | I267014 | 11/2006 |
| TW | M306694 | 2/2007 |
| TW | 200710493 | 3/2007 |
| TW | 200713337 | 4/2007 |
| TW | 200717083 | 5/2007 |
| TW | 200719198 | 5/2007 |
| TW | D117141 | 5/2007 |
| TW | 200722559 | 6/2007 |
| TW | 200727163 | 7/2007 |
| TW | 284927 | 8/2007 |
| TW | 200729241 | 8/2007 |
| TW | 200736979 | 10/2007 |
| TW | 200737414 | 10/2007 |
| TW | 200738558 | 10/2007 |
| TW | I287669 | 10/2007 |
| TW | 200926471 | 6/2009 |
| TW | 200928914 | 7/2009 |
| TW | 200929638 | 7/2009 |
| TW | 200929643 | 7/2009 |
| TW | 201005612 | 7/2009 |
| WO | WO02076724 | 10/2002 |
| WO | WO02076724 A1 | 10/2002 |
| WO | WO2004019119 | 3/2004 |
| WO | WO2004052559 | 6/2004 |
| WO | WO2004114105 | 12/2004 |
| WO | WO2005102924 | 11/2005 |
| WO | WO2005104141 | 11/2005 |
| WO | WO2006003245 | 1/2006 |
| WO | WO2006014241 | 2/2006 |
| WO | WO2006030981 | 3/2006 |
| WO | WO2006031981 | 3/2006 |
| WO | WO2006120803 | 11/2006 |
| WO | WO2006126604 | 11/2006 |
| WO | WO2006130366 | 12/2006 |
| WO | WO2007008518 | 1/2007 |
| WO | 2007012899 | 2/2007 |
| WO | 2007022226 | 2/2007 |
| WO | WO2007063751 | 6/2007 |
| WO | WO2007066649 | 6/2007 |
| WO | WO2007099975 | 9/2007 |
| WO | WO2008013517 | 1/2008 |

OTHER PUBLICATIONS

Yu Xiang, Technique of Touch Panel & the Production of Resistance-type Touch Panel Insulation Dot, Journal of Longyan Teachers College, p. 25-26, vol. 22, No. 6, 2004.

Wu et al."Transparent, Conductive Carbon Nanotube Films". Science,vol. 305,(2004);pp. 1273-1276.

Susuki et al."Investigation of physical and electric properties of silver pastes as binder for thermoelectric materials". Review of Scientific Instruments,76,(2005);pp. 023907-1 to 023907-5.

Fan et al. "Self-Oriented Regular Arrays of Carbon Nanotubes and Their Field Emission Properties". Science, vol. 283, (1999); pp. 512-514.

ASM Handbook."vol. 2 Properties and Selection: Nonferrous Alloys and Special-Purpose Materials".Apr. 2007; pp. 840-853.

Ri Kurosawa, "Technology Trends of Capacitive Touch Panel", Technology and Development of Touch Panel, Amc, First Impression, pp. 54-64, Dec. 27, 2004(the 6th paragraph on p. 55 may be relevant).

George Gruner, "Carbon Nanonets Spark New Electronics", Scientific American, pp. 76-83, May 2007.

Mei Zhang etal., "Strong Transparent, Multifunctional, Carbon Nanotube Sheets", Science, America, AAAS, vol. 309, pp. 1215-1219, Aug. 19, 2005.

Yoshikazu Nakayama, "Technology Development of CNT Long Yarns and CNT Sheets", Nano Carbon Handbook, Japan TSN Inc, pp. 261-266, Jul. 17, 2007(the First 6 Sentences of 2nd, 3rd,4th Paragraphs and the first 3 sentences of 5th paragraph on p. 262,the 4th paragraph on p. 264 and the 5th sentence of 3rd paragraph on p. 265 may be relevant).

Yagasaki Takuya, Nakanishi Rou, "Resistance Film Type Touch Panel", Technologies and Developments of Touch Panels, Amc, First Impression, pp. 80-93, Dec. 27, 2004(the 2nd Paragraph on p. 81 and the 2nd Paragraph on p. 91 may be relevant).

R Colin Johnson, "Carbon nanotubes aim for cheap, durable touch screens",Aug. 2007 http://psroc.phys.ntu.edu.tw/bimonth/v27/615.pdf.

Xianglin Liu, "strong, transparent, multifunctional carbon nanotube sheets", pp. 720-721, Oct. 2005 http://www.eettaiwan.com/articleLogin.do?artId=8800474428&fromWhere=/ART_8800474428_480502_NT_95e7014f.HTM&catId=480502&newsType=NT&pageNo=null&encode=95e7014f.

Zhungchun Wu et al., "Transparent, Conductive Carbon Nanotube Films", Science, vol. 305, pp. 1273-1276, Aug. 27, 2004.

* cited by examiner

TOUCH PANEL, METHOD FOR MAKING THE SAME, AND DISPLAY DEVICE ADOPTING THE SAME

RELATED APPLICATIONS

This application is related to commonly-assigned applications entitled, "TOUCH PANEL", filed Sep. 29, 2008, Ser. No. 12/286,266; "TOUCH PANEL", filed Sep. 29, 2008, Ser. No. 12/286,141; "TOUCH PANEL AND DISPLAY DEVICE USING THE SAME", filed Sep. 29, 2008, Ser. No. 12/286,189; "TOUCH PANEL AND DISPLAY DEVICE USING THE SAME", filed Sep. 29, 2008, Ser. No. 12/286, 181; "TOUCH PANEL AND DISPLAY DEVICE USING THE SAME", filed Sep. 29, 2008, Ser. No. 12,286,176; "TOUCH PANEL AND DISPLAY DEVICE USING THE SAME", filed Sep. 29, 2008, Ser. No. 12/286,166; "TOUCH PANEL AND DISPLAY DEVICE USING THE SAME", filed Sep. 29, 2008, Ser. No. 12/286,178; "TOUCH PANEL AND DISPLAY DEVICE USING THE SAME", filed Sep. 29, 2008, Ser. No. 12/286,148; "TOUCHABLE CONTROL DEVICE", filed Sep. 29, 2008, Ser. No. 12/286,140; "TOUCH PANEL AND DISPLAY DEVICE USING THE SAME", filed Sep. 29,2008, Ser. No. 12/286,154; "TOUCH PANEL AND DISPLAY DEVICE USING THE SAME", filed Sep. 29, 2008, Ser. No. 12/286,216; "TOUCH PANEL AND DISPLAY DEVICE USING THE SAME", filed Sep. 29, 2008, Ser. No. 12/286,146; "TOUCH PANEL AND DISPLAY DEVICE USING THE SAME", filed Sep. 29, 2008, Ser. No. 12/286,145; "TOUCH PANEL AND DISPLAY DEVICE ADOPTING THE SAME", filed Sep. 29, 2008, Ser. No. 12/286,152; "TOUCH PANEL AND DISPLAY DEVICE USING THE SAME", filed Sep. 29, 2008, Ser. No. 12/286,179; "TOUCH PANEL, METHOD FOR MAKING THE SAME, AND DISPLAY DEVICE ADOPTING THE SAME", filed Sep. 29, 2008, Ser. No. 12/286,155; "TOUCH PANEL AND DISPLAY DEVICE USING THE SAME", filed Sep. 29, 2008, Ser. No. 12/286,153; "TOUCH PANEL AND DISPLAY DEVICE USING THE SAME", filed Sep. 29, 2008, Ser. No. 12/286,184; "METHOD FOR MAKING TOUCH PANEL", filed Sep. 29, 2008, Ser. No. 12/286,175; "METHOD FOR MAKING TOUCH PANEL", filed Sep. 29, 2008, Ser. No. 12/286,195; "TOUCH PANEL AND DISPLAY DEVICE USING THE SAME", filed Sep. 29, 2008, Ser No. 12/286,160; "TOUCH PANEL AND DISPLAY DEVICE USING THE SAME", filed Sep. 29, 2008, Ser. No. 12/286,220; "TOUCH PANEL AND DISPLAY DEVICE USING THE SAME", filed Sep. 29, 2008, Ser. No. 12/286, 227; "TOUCH PANEL AND DISPLAY DEVICE USING THE SAME", filed Sep. 29, 2008, Ser. No. 12/286,144; "TOUCH PANEL AND DISPLAY DEVICE USING THE SAME", filed Sep. 29, 2008, Ser. No. 12/286,218; "TOUCH PANEL AND DISPLAY DEVICE USING THE SAME", filed Sep. 29, 2008, Ser. No. 12/286,142; "TOUCH PANEL AND DISPLAY DEVICE USING THE SAME", filed Sep. 29, 2008, Ser. No. 12/286,241; "TOUCH PANEL, METHOD FOR MAKING THE SAME, AND DISPLAY DEVICE ADOPTING THE SAME", filed Sep. 29, 2008Ser. No. 12/286,151; "ELECTRONIC ELEMENT HAVING CARBON NANOTUBES", filed Sep. 29, 2008, Ser. No. 12/286, 143; and "TOUCH PANEL, METHOD FOR MAKING THE SAME, AND DISPLAY DEVICE ADOPTING THE SAME", filed Sep. 29, 2008, Ser. No. 12/286,219. The disclosures of the above-identified applications are incorporated herein by reference.

BACKGROUND

1. Field of the Invention

The present invention relates to a carbon nanotube based touch panel, a method for making the touch panel, and a display device incorporating the touch panel.

2. Discussion of Related Art

Following the advancement in recent years of various electronic apparatuses, such as mobile phones, car navigation systems and the like, toward high performance and diversification, there has been continuous growth in the number of electronic apparatuses equipped with optically transparent touch panels at the front of their respective display devices (e.g., liquid crystal panels). A user of any such electronic apparatus operates it by pressing or touching the touch panel with a finger, a pen, a stylus, or a like tool while visually observing the display device through the touch panel. Therefore, a demand exists for touch panels that are superior in visibility and reliable in operation.

At present, different types of touch panels, including resistance, capacitance, infrared, and surface sound-wave types have been developed. Resistance-type touch panels have been widely used, due to their high accuracy and low cost of production.

A conventional resistance-type touch panel includes an upper substrate, a transparent upper conductive layer formed on a lower surface of the upper substrate, a lower substrate, a transparent lower conductive layer formed on an upper surface of the lower substrate, and a plurality of dot spacers formed between the transparent upper conductive layer and the transparent lower conductive layer. The transparent upper conductive layer and the transparent lower conductive layer are formed of electrically conductive indium tin oxide (ITO).

In operation, an upper surface of the upper substrate is pressed with a finger, a pen, or a like tool, and visual observation of a screen on the liquid crystal display device provided on a back side of the touch panel is provided. The pressing causes the upper substrate to be deformed, and the upper conductive layer thus comes in contact with the lower conductive layer at the position where the pressing occurs. Voltages are separately applied by an electronic circuit to the transparent upper conductive layer and the transparent lower conductive layer. Thus, the deformation position can be detected by the electronic circuit.

Each of the transparent conductive layers (e.g., ITO layers) is generally formed by means of ion-beam sputtering, and this method is relatively complicated. Additionally, the ITO layer has poor wearability/durability, low chemical endurance, and uneven resistance over an entire area of the touch panel. Furthermore, the ITO layer has relatively low transparency. All the above-mentioned problems of the ITO layer makes for a touch panel with low sensitivity, accuracy, and brightness.

What is needed, therefore, is to provide a durable touch panel with high sensitivity, accuracy, and brightness, a method for making the touch panel, and a display device incorporating the touch panel.

SUMMARY

In one embodiment, a touch panel includes a first electrode plate, and a second electrode plate separated from the first electrode plate. The first electrode plate includes a first substrate and a first conductive layer located on a lower surface of the first substrate. The second electrode plate includes a second substrate and a second conductive layer located on an upper surface of the second substrate. At least one of the first conductive layer and the second conductive layer includes a carbon nanotube layer. The carbon nanotubes in the carbon nanotube layer are entangled with each other.

Other novel features and advantages of the present touch panel, method for making the same, and display device incorporating the same become more apparent from the following detailed description of exemplary embodiments when taken in conjunction with the accompanying drawings.

BRIEF DESCRIPTION OF THE DRAWINGS

Many aspects of the present touch panel, method for making the same, and display device incorporating the same can be better understood with reference to the following drawings. The components in the drawings are not necessarily to scale, the emphasis instead being placed upon clearly illustrating the principles of the present touch panel, method for making the same, and display device incorporating the same.

Figure 1:
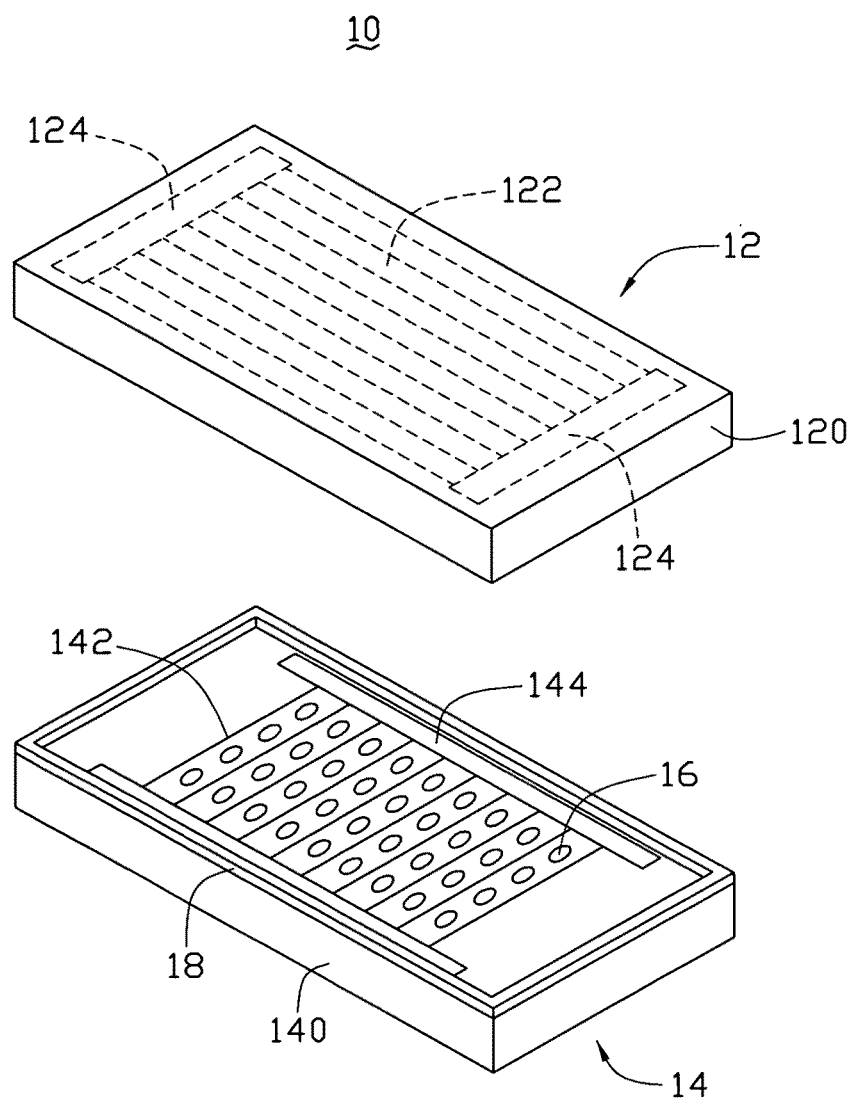
FIG. 1 is an exploded, isometric view of a touch panel in accordance with a present embodiment, showing a first substrate thereof inverted.

Corresponding reference characters indicate corresponding parts throughout the several views. The exemplifications set out herein illustrate at least one exemplary embodiment of the present touch panel, method for making the same, and display device adopting the same, in at least one form, and such exemplifications are not to be construed as limiting the scope of the invention in any manner.

DETAILED DESCRIPTION OF EXEMPLARY EMBODIMENTS

Reference will now be made to the drawings to describe, in detail, embodiments of the present touch panel, method for making the same, and display device adopting the same.

Figure 2:
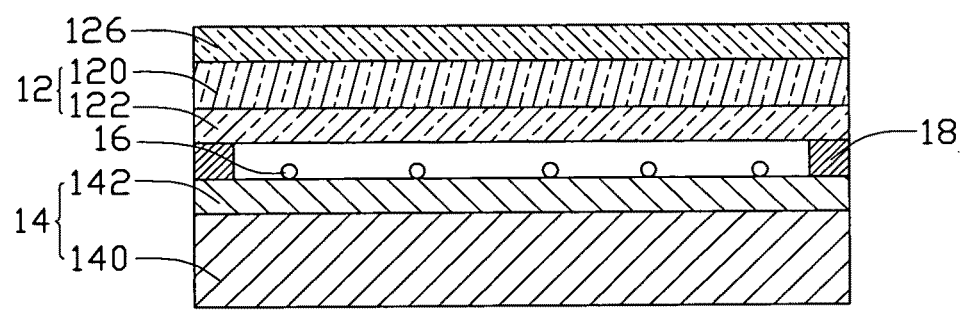
FIG. 2 is a transverse, cross-sectional view of the touch panel of FIG. 1 once assembled.

Referring to FIG. 1 and FIG. 2, a touch panel 10 includes a first electrode plate 12, a second electrode plate 14, and a plurality of dot spacers 16 located between the first electrode plate 12 and the second electrode plate 14.

The first electrode plate 12 includes a first substrate 120, a first conductive layer 122, and two first-electrodes 124. The first substrate 120 includes an upper surface and a lower surface, each of which is substantially flat. The two first-electrodes 124 and the first conductive layer 122 are located on the lower surface of the first substrate 120. The two first-electrodes 124 are located separately on opposite ends of the first conductive layer 122. A direction from one of the first-electrodes 124 across the first conductive layer 122 to the other first electrode 124 is defined as a first direction. The two first-electrodes 124 are electrically connected with the first conductive layer 122.

The second electrode plate 14 includes a second substrate 140, a second conductive layer 142, and two second-electrodes 144. The second substrate 140 includes an upper surface and a lower surface, each of which is substantially flat. The two second-electrodes 144 and the second conductive layer 142 are located on the upper surface of the second substrate 140. The two second-electrodes 144 are located separately on opposite ends of the second conductive layer 142. A direction from one of the second-electrodes 144 across the second conductive layer 142 to the other second-electrodes 144 is defined as a second direction. The two second-electrodes 144 are electrically connected with the second conductive layer 142.

The first direction is set at an angle to the second direction. In the shown embodiment the angle is set to approximately ninety (90) degrees. The two first-electrodes 124 are aligned parallel to the second direction, and the two second-electrodes 144 are aligned parallel to the first direction. The first substrate 120 is a transparent and flexible film/plate. The second substrate 140 is a transparent plate. The first-electrodes 124 and the second-electrodes 144 are made of metal or any other suitable materials. In the present embodiment, the first substrate 120 is a polyester film, the second substrate 140 is a glass plate, and the first-electrodes 124 and the second-electrodes 144 are made of conductive silver paste.

An insulative layer 18 is provided between the first and the second electrode plates 12 and 14. The first electrode plate 12 is located on the insulative layer 18. The first conductive layer 122 is opposite to, but is spaced from, the second conductive layer 142. The dot spacers 16 are separately located on the second conductive layer 142. A distance between the second electrode plate 14 and the first electrode plate 12 is in an approximate range from 2 to 20 microns. The insulative layer 18 and the dot spacers 16 are made of, for example, insulative resin or any other suitable insulative material. Insulation between the first electrode plate 12 and the second electrode plate 14 is provided by the insulative layer 18 and the dot spacers 16. It is to be understood that the dot spacers 16 are optional, particularly when the touch panel 10 is relatively small. They serve as supports given the size of the span and the strength of the first electrode plate 12.

At least one of the first conductive layer 122 and the second conductive layer 142 includes a carbon nanotube layer formed of a plurality of carbon nanotubes entangled with each other to form a carbon nanotube flocculent structure. The adjacent carbon nanotubes are combined and entangled by van der Waals attractive force therebetween, thereby forming an entangled structure/microporous structure. Further, the carbon nanotubes in the carbon nanotube layer are isotropic. It is understood that the carbon nanotube layer is very microporous. Sizes of the micropores are less than 10 micrometers. Length and width of the carbon nanotube layer are not limited. A thickness of the carbon nanotube layer approximately ranges from 0.5 nanometers to 100 micrometers. The carbon nanotubes in the carbon nanotube layer can be selected from a group consisting of single-walled, double-walled, and multi-walled carbon nanotubes. Diameters of the single-walled carbon nanotubes approximately range from 0.5 nanometers to 50 nanometers. Diameters of the double-walled carbon nanotubes approximately range from 1 nanometer to 50 nanometers. Diameters of the multi-walled carbon nanotubes approximately range from 1.5 nanometers to 50 nanometers.

Due to the carbon nanotube layer including a plurality of isotropic carbon nanotubes and micropores, the carbon nanotube layer has excellent resistance distribution and light transparence. Thus the touch panel and the display device adopting the same have good accuracy and brightness.

In the present embodiment, the first conductive layer 122 and the second conductive layer 142 both include, at a minimum, a carbon nanotube layer. The carbon nanotube layer includes a plurality of carbon nanotubes entangled with each other.

A transparent protective film 126 is located on the upper surface of the first electrode plate 12. The material of the transparent protective film 126 can be selected from a group consisting of silicon nitride, silicon dioxide, benzocyclobutenes, polyester film, and polyethylene terephthalate. The transparent protective film 126 can be made of slick plastic and receive a surface hardening treatment to protect the first electrode plate 12 from being scratched when in use.

The touch panel 10 can include a shielding layer (not shown) located on the lower surface of the second substrate 140. The material of the shielding layer can be indium tin oxide, antimony tin oxide, carbon nanotube film, and other conductive materials. In the present embodiment, the shielding layer is a carbon nanotube film. The carbon nanotube film includes a plurality of carbon nanotubes, and the orientation of the carbon nanotubes therein can be arbitrary. In the present embodiment the carbon nanotubes in the carbon nanotube film of the shielding layer are arranged along a same direction. The carbon nanotube film is connected to ground and acts as a shield, thus enabling the touch panel 10 to operate without interference (e.g., electromagnetic interference).

Figure 3:
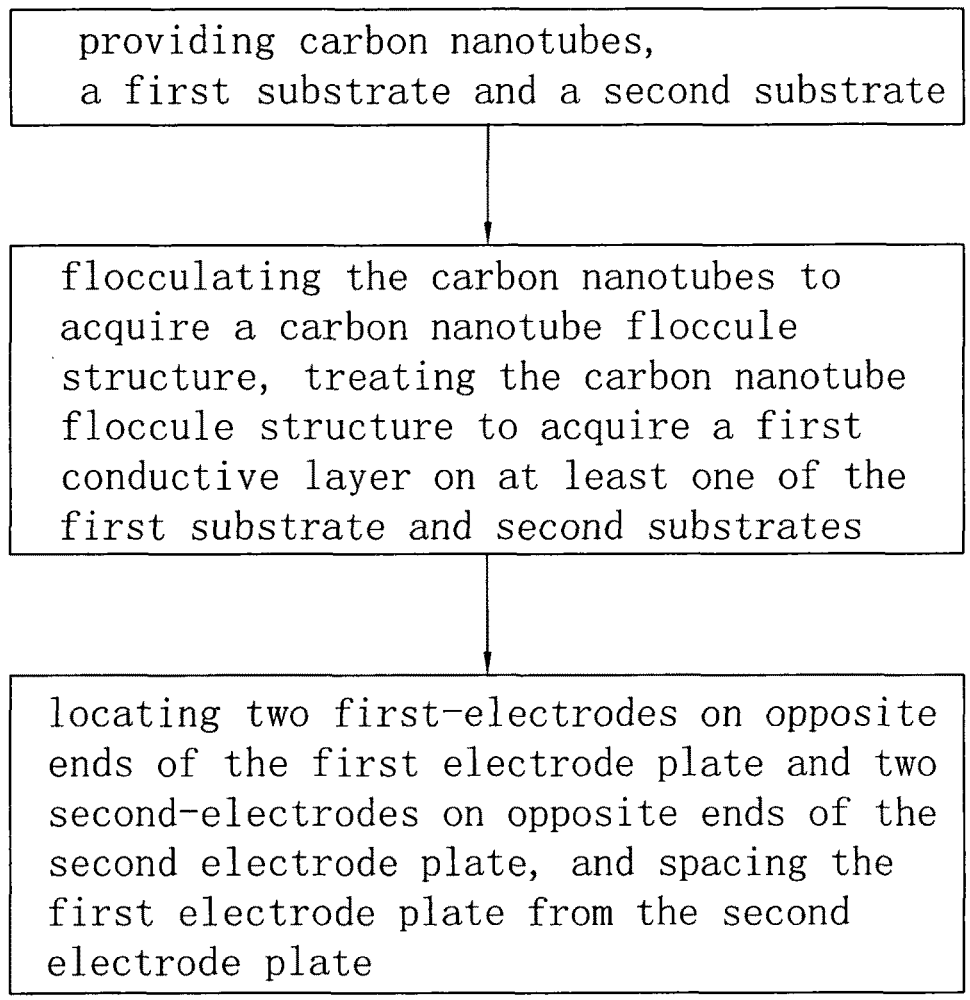
FIG. 3 is a flow chart of a method for making the touch panel of FIG. 1, in accordance with a present embodiment.

Referring to FIG. 3, a method for making the above-described touch panel 10 includes the steps of: (a) providing carbon nanotubes, a first substrate 120 and a second substrate 140; (b) flocculating the carbon nanotubes to acquire a carbon nanotube floccule structure, forming a first conductive layer 122 on the first substrate 120 and/or a second conductive layer 142 on the second substrate 140 with the carbon nanotube floccule structure; and (c) locating two first-electrodes 124 on opposite ends of the first electrode plate 12 and two second-electrodes 144 on opposite ends of the second electrode plate 14, and spacing the first electrode plate 12 from the second electrode plate 14.

In step (a), the array of carbon nanotubes specifically is a super-aligned array of carbon nanotubes. The super-aligned array of carbon nanotubes can be formed by the substeps of: (a1) providing a substantially flat and smooth substrate; (a2) forming a catalyst layer on the substrate; (a3) annealing the substrate with the catalyst layer in air at a temperature in the approximate range from 700° C. to 900° C. for about 30 to 90 minutes; (a4) heating the substrate with the catalyst layer to a temperature in the approximate range from 500° C. to 740° C. in a furnace with a protective gas therein; and (a5) supplying a carbon source gas to the furnace for about 5 to 30 minutes and growing the super-aligned array of carbon nanotubes on the substrate.

In step (a1), the substrate can be a P-type silicon wafer, an N-type silicon wafer, or a silicon wafer with a film of silicon dioxide thereon. In this embodiment, a 4-inch P-type silicon wafer is used as the substrate.

In step (a2), the catalyst can be made of iron (Fe), cobalt (Co), nickel (Ni), or any alloy thereof.

In step (a4), the protective gas can be made up of at least one of nitrogen ($N_2$), ammonia ($NH_3$), and a noble gas. In step (a5), the carbon source gas can be a hydrocarbon gas, such as ethylene ($C_2H_4$), methane ($CH_4$), acetylene ($C_2H_2$), ethane ($C_2H_6$), or any combination thereof.

The super-aligned array of carbon nanotubes can have a height of about 50 microns to 5 millimeters. The super-aligned array of carbon nanotubes includes a plurality of carbon nanotubes parallel to each other and approximately perpendicular to the substrate. The carbon nanotubes in the array of carbon nanotubes can be selected from a group consisting of single-walled carbon nanotubes, double-walled carbon nanotubes, and multi-walled carbon nanotubes. Diameters of the single-walled carbon nanotubes approximately range from 0.5 nanometers to 50 nanometers. Diameters of the double-walled carbon nanotubes approximately range from 1 nanometer to 50 nanometers. Diameters of the multi-walled carbon nanotubes approximately range from 1.5 nanometers to 50 nanometers.

The super-aligned array of carbon nanotubes formed under the above conditions is essentially free of impurities such as carbonaceous or residual catalyst particles. The carbon nanotubes in the super-aligned array are closely packed together by the van der Waals attractive force.

In step (b), the flocculating process includes the substeps of: (b1) adding the carbon nanotubes to a solvent to get a carbon nanotube floccule structure; (b2) removing the solvent to obtain a carbon nanotube layer; (b3) applying the carbon nanotube layer to the first substrate 120 and/or the second substrate 140 respectively.

In step (b1) of the present embodiment, the solvent is selected from the group consisting of water and volatile organic solvent. After adding the carbon nanotubes to the solvent, a process of flocculating is executed to get the carbon nanotube floccule structure. The process of flocculating is selected from the group of processes consisting of ultrasonic dispersion and high-strength agitating/vibrating. In this embodiment, ultrasonic dispersion is used to flocculate the solvent containing the carbon nanotubes for about 10~30 minutes. Due to the carbon nanotubes in the solvent having a large specific surface area and the carbon nanotubes having a large van der Waals attractive force, the flocculated carbon nanotubes form an entangled structure (i.e., carbon nanotube floccule structure).

In step (b2), the removing the solvent can be done by the process of pumping filtration which includes the substeps of: (b21) filtering the solvent containing the carbon nanotube floccule structure through a microporous membrane and into an air-pumping funnel; and (b23) air-pumping and drying the carbon nanotube floccule structure captured on the microporous membrane to obtain the carbon nanotube layer.

In step (b21), the microporous membrane has a smooth surface. And the diameters of micropores in the membrane are about 0.22 microns. The pumping filtration can exert air pressure on the carbon nanotube floccule structure, thus, forming a uniform carbon nanotube layer. Moreover, due to the microporous membrane having a smooth surface, the carbon nanotube layer can be easily separated from the membrane.

In step (b3), the carbon nanotube layer is cut into a predetermined shape, and is attached to the first substrate 120 and/or the second substrate 140.

Obtaining a carbon nanotube floccule structure can be also accomplished by a step (b'). The step (b') includes the substeps of: (b1') adding the carbon nanotubes to a solvent to obtain a carbon nanotube floccule structure; (b2') separating the carbon nanotube floccule structure from the solvent, and (b3') shaping the separated carbon nanotube floccule structure on the first substrate 120 and/or the second substrate 140, to form a carbon nanotube layer on the first substrate 120 and/or the second substrate 140.

In step (b2'), the process of separating the carbon nanotube floccule structure from the solvent includes the substeps of: (b21') pouring the solvent containing the carbon nanotube floccule structure into a funnel having a filter; and (b22') drying the carbon nanotube floccule structure on the filter to obtain the carbon nanotube floccule structure free of solvent.

In step (b22'), a time of drying can be selected according to practical needs. The carbon nanotube floccule structure on the filter is bundled together, so as to form an irregular carbon nanotube flocculate structure.

In step (b3'), the process of shaping the separated carbon nanotube floccule structure into the carbon nanotube layer includes the substeps of: (b31') putting the carbon nanotube floccule structure on the first substrate and/or the second substrate, and working the carbon nanotube floccule structure into a predetermined shape; (b32') pressing the worked carbon nanotube floccule structure with pressure to yield a desirable shape; and (b33') drying the spread carbon nanotube floccule structure to remove the residual solvent to form a carbon nanotube layer on the first substrate and/or the second substrate.

In step (b3'), the separated carbon nanotube floccule structure also can be put on another substrate. Then the raw carbon nanotube floccule structure is pressed with a certain pressure to yield a desirable shape and is cut into sizes of the first substrate and/or the second substrate, and then is adhered on the first substrate and/or the second substrate to form a carbon nanotube layer thereon.

It is to be understood that the size of the spread carbon nanotube floccule structure is, advantageously, used to control a thickness and a surface density of the carbon nanotube layer and can be adjusted as needed. As such, the larger the area of a given amount of the carbon nanotube floccule structure is spread over, the less the thickness and the density of the carbon nanotube layer.

Figure 4:
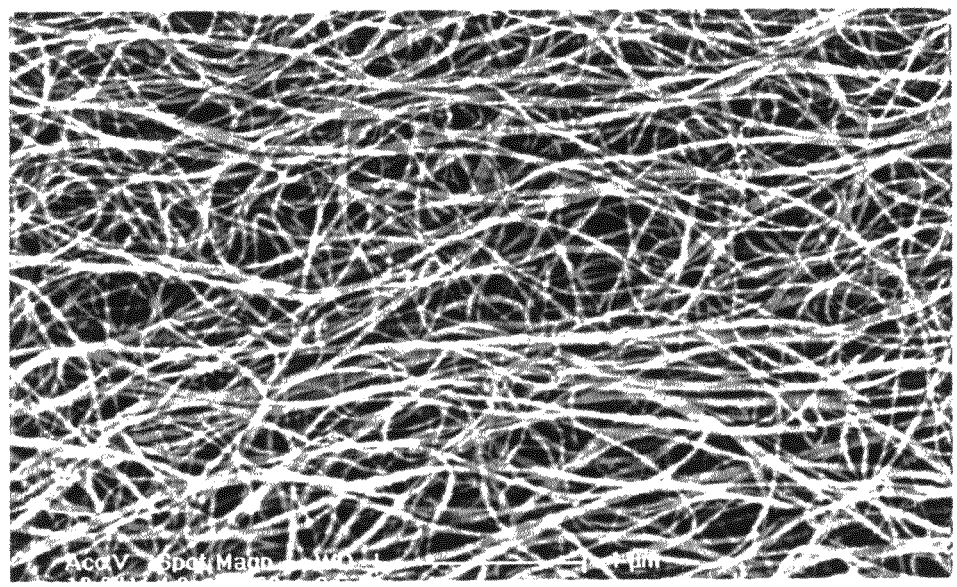
FIG. 4 shows Scanning Electron Microscope (SEM) image of the entangled carbon nanotubes acquired by the present embodiment.

Referring to FIG. 4, the carbon nanotube layer includes a plurality of carbon nanotubes entangled with each other, and the carbon nanotubes are isotropic therein. The adjacent carbon nanotubes are combined and entangled by van der Waals attractive force, thereby forming an entangled structure/microporous structure. The carbon nanotube layer includes a plurality of micropores. The sizes of the micropores are less than 10 micrometers. Thereby, the carbon nanotube layer has good strength. Also because of the flexibility of the carbon nanotube layer, the carbon nanotube layer can easily be folded or bent into arbitrary shapes without rupture.

The carbon nanotube layer produced by the method has the following virtues. Firstly, through flocculating, the carbon nanotubes are bundled together by van der Walls attractive force to form an entangled mesh/floccule structure. Thus, the carbon nanotube layer is very durable. Secondly, the carbon nanotube layer is very simply and efficiently produced by the method. A result of the production process of the method, is that the thickness and surface density of the carbon nanotube layer are controllable.

Unlike previous methods for making an ITO film, the present method does not require a vacuum environment and heat processing, thus, the carbon nanotube layer formed by the flocculating method and used as the transparent conductive layer has the advantage of being low cost, environmentally safe, and energy efficient.

In step (c) of the present embodiment, the first-electrodes 124 and the second-electrodes 144 are made of conductive silver paste. The methods for making the first-electrodes 124 and the second-electrodes 144 includes the following steps of: (c1) coating the conductive silver paste on opposite ends of the first conductive layer 122 of the first electrode plate 12 along the first direction and on opposite ends of the second conductive layer 142 of the second electrode plate 14 along the second direction via screen printing method or spraying method; (c2) baking the first electrode plate 12 and the second electrode plate 14 in an oven for 10-60 minutes at a temperature in an approximate range from 100° C. to 120° C. to solidify the conductive silver paste, and thus acquiring the first-electrodes 124 and the second-electrodes 144. The first direction is perpendicular to the second direction. Suitable materials, other than silver paste, can also be used.

The insulative layer 18 can be made of insulative resin or any other insulative material (e.g., insulative binding agent). In the present embodiment, the material of the insulative layer 18 is insulative binding agent and the insulative binding agent can be coated on the edges of the upper surface of the second electrode plate 14 and/or on the lower surface of the first electrode plate 12.

The material of the transparent protective film 126 can be selected from a group consisting of silicon nitrides, silicon dioxides, benzocyclobutenes, polyester films, and polyethylene terephthalates. In the present embodiment, the transparent protective film is an adhesive polyethylene terephthalate film and the adhesive polyethylene terephthalate film can be adhered to the surface of the touch panel, serving as transparent protective film 126.

Figure 5:
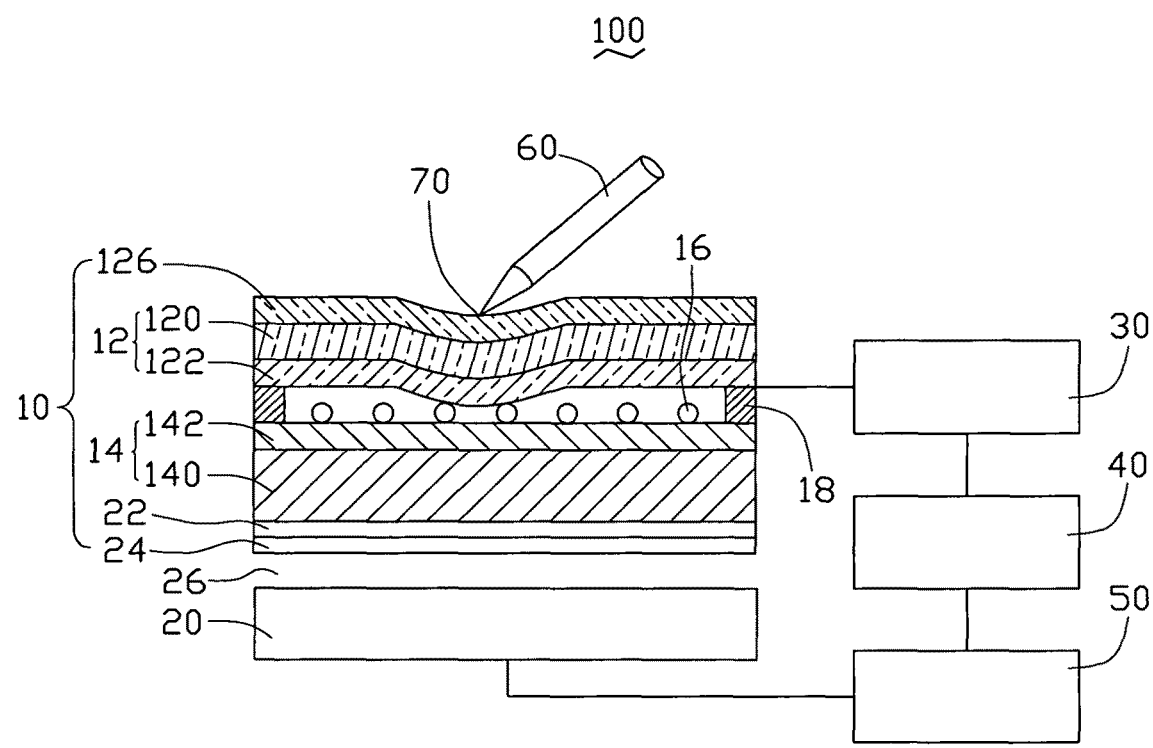
FIG. 5 is essentially a schematic cross-sectional view of the touch panel of the present embodiment used with a display element of a display device, showing operation of the touch panel with a touch tool.

Referring to FIG. 5, a display device 100 includes the touch panel 10, a display element 20, a first controller 30, a central processing unit (CPU) 40, and a second controller 50. The touch panel 10 is opposite and adjacent to the display element 20 and is connected to the first controller 30 by an external circuit. The touch panel 10 can be spaced from the display element 20 or installed directly on the display element 20. In the illustrated embodiment, the touch panel 10 is spaced from the display element 20, with a gap 26. The first controller 30, the CPU 40, and the second controller 50 are electrically connected. The CPU 40 is connected to the second controller 50 to control the display element 20.

The display element 20 can be, e.g., a liquid crystal display, a field emission display, a plasma display, an electroluminescent display, a vacuum fluorescent display, a cathode ray tube, or another display device.

When a shielding layer 22 is located on the lower surface of the second substrate 140, a passivation layer 24 is located on a surface of the shielding layer, on the side away from the second substrate 140. The material of the passivation layer 24 can, for example, be silicon nitrides or silicon dioxides. The passivation layer 24 can be spaced from the display element 20 a certain distance or can be installed directly on the display element 20. The passivation layer 24 can protect the shielding layer 22 from chemical or mechanical damage.

In operation, 5V are applied to each of the two first-electrodes 124 of the first electrode plate 12 and to each of the two second-electrodes 144 of the second electrode plate 14. A user operates the display by pressing the first electrode plate 12 of the touch panel 10 with a finger, a pen 60, or the like while visually observing the display element 20 through the touch panel 10. This pressing causes a deformation 70 of the first electrode plate 12. The deformation 70 of the first electrode plate 12 causes a connection between the first conductive layer 122 and the second conduction layer 142 of the second electrode plate 14. Changes in voltages in the first direction of the first conductive layer 142 and the second direction of the second conductive layer 142 can be detected by the first controller 30. Then the first controller 30 transforms the changes of voltages into coordinates of the pressing point, and sends the coordinates thereof to CPU 40. The CPU 40 then sends out commands according to the coordinates of the pressing point and controls the display of the display element 20.

The properties of the carbon nanotubes provide superior toughness, high mechanical strength, and uniform conductivity to the carbon nanotube layer. Thus, the touch panel 10 and the display device 100 adopting the carbon nanotube layer are durable and highly conductive. Further, the flocculating method for fabricating the carbon nanotube layer is simple. As such, the method for fabricating the carbon nanotube layer is suitable for the mass production of touch panels 10 and display device 100 and reduces the cost thereof. Furthermore, the carbon nanotube layer has a microporous structure containing a plurality of micropores, whose diameters are less than 10 micrometers. Thus, the carbon nanotube layer has high transparency, thereby promoting improved brightness of the touch panel 10 and the display device 100.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

It is also to be understood that the above description and the claims drawn to a method may include some indication in reference to certain steps. However, the indication used is only to be viewed for identification purposes and not as a suggestion as to an order for the steps.

What is claimed is:

1. A touch panel comprising:
a first electrode plate comprising a first substrate and a first conductive layer located on a lower surface of the first substrate; and
a second electrode plate separated from the first electrode plate, and comprising a second substrate and a second conductive layer located on an upper surface of the second substrate;
wherein at least one of the first and second conductive layers comprises a carbon nanotube layer; the carbon nanotube layer comprises a carbon nanotube floccule structure comprising a plurality of carbon nanotubes, the plurality of carbon nanotubes in the carbon nanotube layer are isotropic, and a majority of adjacent carbon nanotubes of the plurality of carbon nanotubes are entangled with each other.

2. The touch panel as claimed in claim 1, wherein a thickness of the carbon nanotube layer approximately ranges from 0.5 nanometers to 100 micrometers.

3. The touch panel as claimed in claim 1, wherein the adjacent carbon nanotubes are adhered together by van der Waals attractive force therebetween, and form the carbon nanotube floccule structure having micropores.

4. The touch panel as claimed in claim 1, wherein the carbon nanotubes in the carbon nanotube layer are selected from the group consisting of single-walled carbon nanotubes, double-walled carbon nanotubes, and multi-walled carbon nanotubes.

5. The touch panel as claimed in claim 4, wherein diameters of the single-walled carbon nanotubes approximately ranges from 0.5 nanometers to 50 nanometers, diameters of the double-walled carbon nanotubes approximately ranges from 1 nanometer to 50 nanometers, and diameters of the multi-walled carbon nanotubes approximately ranges from 1.5 nanometers to 50 nanometers.

6. The touch panel as claimed in claim 1, wherein the first electrode plate further comprises two first-electrodes located separately at opposite ends of the first conductive layer thereof, a second direction is substantially perpendicular to a first direction, and each of the two first-electrodes is oriented along the second direction and electrically connected to the first conductive layer.

7. The touch panel as claimed in claim 6, wherein the second electrode plate further comprises two second-electrodes located separately at opposite ends of the second conductive layer thereof, and each of the two second-electrodes is oriented along the first direction and electrically connected to the second conductive layer.

8. The touch panel as claimed in claim 1, further comprising an insulative layer that insulates the first electrode plate from the second electrode plate.

9. The touch panel as claimed in claim 8, further comprising one or more dot spacers located between the first conductive layer and the second conductive layer.

10. The touch panel as claimed in claim 1, further comprising a shielding layer located on a lower surface of the second substrate, and a material of the shielding layer being selected from the group consisting of indium tin oxides, antimony tin oxides, and carbon nanotube films.

11. The touch panel as claimed in claim 1, further comprising a transparent protective film located on an upper surface of the first electrode plate, and a material of the transparent protective film being selected from the group consisting of silicon nitrides, silicon dioxides, benzocyclobutenes, polyester films, and polyethylene terephthalates.

12. A display device comprising:
a touch panel comprising:
a first electrode plate comprising a first substrate and a first conductive layer located on a lower surface of the first substrate;
a second electrode plate separated from the first electrode plate and comprising a second substrate and a second conductive layer located on an upper surface of the second substrate; and
wherein at least one of the first and second conductive layers comprises a carbon nanotube layer comprising a carbon nanotube floccule structure; the carbon nanotube floccule structure consists of a plurality of carbon nanotubes, and the carbon nanotube floccule structure is isotropic; and
a display element opposite and adjacent to the touch panel.

13. The display device as claimed in claim 12, further comprising a first controller, a central processing unit, and a second controller; wherein the display element is connected to the first controller, and the central processing unit is connected to the second controller.

14. The display device as claimed in claim 12, wherein the touch panel is spaced from the display element with a distance.

15. The display device as claimed in claim 12, wherein the touch panel is located on the display element.

16. The display device as claimed in claim 12, further comprising a passivation layer located on a surface of the touch panel, and a material of the passivation layer being selected from the group consisting of silicon nitride and silicon dioxide.

17. The touch panel as claimed in claim 12, wherein adjacent carbon nanotubes are entangled with each other, and the carbon nanotube floccule structure has a plurality of micropores defined by the plurality of carbon nanotubes.

18. The touch panel as claimed in claim 1, wherein at least one of the first and second conductive layers consists of a carbon nanotube layer, the carbon nanotube layer consists of a carbon nanotube floccule structure consisting of a plurality of carbon nanotubes.

19. A touch panel comprising:
a first electrode plate comprising a first substrate and a first conductive layer located on a lower surface of the first substrate; and
a second electrode plate separated from the first electrode plate, and comprising a second substrate and a second conductive layer located on an upper surface of the second substrate;

wherein at least one of the first and second conductive layers consists of a carbon nanotube layer; the carbon nanotube layer consists of a carbon nanotube floccule structure consisting of a plurality of carbon nanotubes, a majority of adjacent carbon nanotubes of the plurality of carbon nanotubes are entangled with each other and adhered together by van der Waals attractive force therebetween, and the carbon nanotube floccule structure has a plurality of micropores defined by the plurality of carbon nanotubes.

20. The touch panel as claimed in claim 19, wherein the carbon nanotubes in the carbon nanotube layer are isotropic and a length of the carbon nanotubes is above 10 micrometers.

21. The touch panel as claimed in claim 19, wherein the micropores have a diameter less than 10 micrometers.

22. The touch panel as claimed in claim 19, further comprising one or more dot spacers located between the first conductive layer and the second conductive layer.

23. The touch panel as claimed in claim 19, wherein a thickness of the carbon nanotube layer approximately ranges from 0.5 nanometers to 100 micrometers.

24. The touch panel as claimed in claim 19, further comprising a shielding layer located on a lower surface of the second substrate, and a material of the shielding layer being selected from the group consisting of indium tin oxides, antimony tin oxides, and carbon nanotube films.

\* \* \* \* \*